United States Patent

Woo

[11] 4,221,895
[45] Sep. 9, 1980

[54] THERMALLY RESISTANT THERMOSETTING AROMATIC POLYMERS CONTAINING PENDANT 1-ALKYNYL SUBSTITUENTS

[75] Inventor: Edmund P. Woo, Midland, Mich.

[73] Assignee: The Dow Chemical Company, Midland, Mich.

[21] Appl. No.: 897,312

[22] Filed: Apr. 18, 1978

[51] Int. Cl.² .............. C08G 63/54; C08G 75/24; C08G 75/26

[52] U.S. Cl. .............. 526/270; 260/37 R; 260/37 N; 260/40 R; 428/458; 428/461; 526/259; 526/261; 526/266; 526/268; 526/280; 526/281; 526/284; 526/285; 528/128; 528/171; 528/174; 528/175; 528/176; 528/190; 528/191

[58] Field of Search .............. 526/270, 280, 284, 285, 526/259, 261, 266, 268, 281; 260/37 R, 37 N, 40 R, 41 AG; 528/128, 171, 174, 175, 176, 190, 191

[56] References Cited

U.S. PATENT DOCUMENTS

| | | | |
|---|---|---|---|
| 3,082,242 | 3/1963 | Miller et al. | 526/285 |
| 3,153,020 | 10/1964 | Butler et al. | 526/285 |
| 3,380,965 | 4/1968 | Matzner | 526/285 |
| 3,845,018 | 10/1974 | Bilow et al. | 526/285 |
| 3,882,073 | 5/1975 | Cessna, Jr. | 526/285 |
| 3,935,167 | 1/1976 | Marvel et al. | 526/285 |
| 4,058,505 | 11/1977 | D'Alelio | 526/285 |
| 4,098,767 | 7/1978 | Bilow | 526/285 |
| 4,108,926 | 8/1978 | Arnold et al. | 526/285 |

*Primary Examiner*—Lester L. Lee

[57] ABSTRACT

Thermally resistant thermoset polymers are formed by heating a thermosetting aromatic prepolymer having at least two pendant alkynyl groups, e.g., a thermosetting prepolymer represented by the formula:

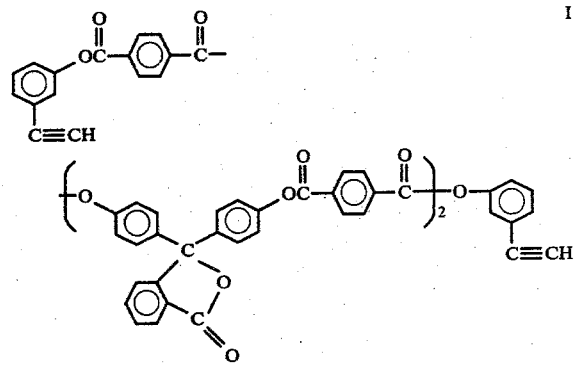

The resulting thermoset polymers are sufficiently resistant to heat to be usefully employed as engine parts in the internal combustion engines of automobiles and the like.

12 Claims, No Drawings

THERMALLY RESISTANT THERMOSETTING AROMATIC POLYMERS CONTAINING PENDANT 1-ALKYNYL SUBSTITUENTS

BACKGROUND OF THE INVENTION

The invention relates to thermosetting aromatic prepolymers and to the thermally resistant thermoset polymers derived therefrom.

Thermosetting prepolymers are well known to be useful in many widely varied applications. For example, one of the most conventional thermosetting prepolymers, the unsaturated polyester resins are often used in the molding of glass fiber reinforced or other fiber reinforced products such as automobile bodies, aircraft parts, chairs, heater housings, trays, etc. Some of the advantages of thermoset polymer products over metals include lightweight, high strength to weight ratio, resistance to corrosion and part design flexibility. While such unsaturated polyester resins are typically suitable in the aforementioned applications, they generally do not possess the resistance to high temperatures needed to enable them to be suitably employed as parts for internal combustion engines, magnet wire coatings and other articles which are normally exposed to temperatures above 200° C. In fact, when such polyester resins are exposed to such high temperatures for substantial periods of time, they undergo severe weight losses and loss of physical properties which are believed to be caused by the thermal oxidation of the thermoset polyester molecules. Moreover, such unsaturated polyester resins are multicomponent systems, consisting of catalysts, reactive diluents and the base resins. These multicomponent systems must be critically formulated before use and, once formulated, have only limited shelf-life.

Other thermosetting prepolymers that have been employed in applications similar to those employing the polyester resins include the epoxy and phenolic resins. All of such resins suffer from the same general lack of ability to withstand high temperatures for prolonged periods without significant weight loss and loss of other physical properties exhibited by the polyester resins. Furthermore, the reaction necessary to cure phenolic resins inevitably liberates volatile by-products, thereby creating undesirable voids in the cured resin. Thus, one-component resin systems which cure without the liberation of volatile by-products to cured products capable of withstanding prolonged exposure to high temperatures would be desirable.

Recently, e.g., U.S. Pat. Nos. 3,935,197; 3,845,018 and 3,882,073, attempts have been made to prepare such one-component resin systems. While such attempts have been successful to some degree, further increase in temperature resistance is required for acceptable utility as engine parts and the like. Moreover, such recently developed resins are generally difficult to prepare, involve the use of expensive starting materials and often require the use of very expensive solvents in their conversion to the desired fabricated products.

Therefore, it would be highly desirable to provide new thermosetting compositions which are easily prepared from relatively inexpensive starting materials and are readily dissolved in conventional organic solvents and which cure to form thermoset products exhibiting high thermal resistance.

SUMMARY OF THE INVENTION

The present invention is, in one aspect, an uncured aromatic thermosetting prepolymer which (1) bears at least two pendant alkynyl groups, (2) is essentially free of acyclic aliphatic carbon to carbon bonds and (3) comprises aromatic groups linked together by carbonyloxy and/or sulfonyloxy moieties. In another aspect, the present invention is the thermoset polymer resulting from the heat curing of the aforementioned thermosetting prepolymer.

In view of the significant losses of physical properties exhibited by the known polyester, phenolic, or epoxy resins when they are exposed to high temperatures for prolonged periods of time, it is indeed surprising that the thermoset polymers of the present invention having chemical structures somewhat similar to these known resins essentially retain their original physical properties even when exposed to a temperature of 250° C. for prolonged periods of time, e.g., 1000 hours. Most advantageous is the fact that the polymers of the present invention can be readily prepared from relatively inexpensive starting materials. Also, the preferred prepolymers of the instant invention are readily soluble in such conventional organic solvents as methylene chloride, chloroform and 1,2-dichloroethane.

As a result of their unusually high resistance to temperatures above 250° C., the novel polymers of the present invention are useful as engine parts in internal combustion engines, coatings for magnet wires used in compact motors, lamina material in the manufacture of circuit boards, molding compositions for a wide variety of electrical applications, high temperature adhesives, plasticizers for high heat resistant plastics and insulative films.

DETAILED DESCRIPTION OF THE ILLUSTRATIVE EMBODIMENTS

In order that the aromatic thermoset polymers of the present invention have the desired thermal stability, their thermosetting precursors (prepolymers) are essentially free of acyclic aliphatic C—C bonds and generally comprise aromatic groups linked together by carbonyloxy or sulfonyloxy moieties provided that essentially all molecules of the thermosetting prepolymer bear at least two pendant alkynyl groups. For the purposes of this invention, the term "carbonyloxy moiety" shall mean a divalent radical having a carbonyl group bonded to an oxygen, e.g.,

and the term "sulfonyloxy" shall mean a sulfonyl bonded to oxygen or a sulfinyl bonded to oxygen, e.g.,

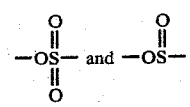

Preferred aromatic thermosetting prepolymers are those represented by the formula:

wherein each Ar is individually an aromatic group essentially free of acyclic, aliphatic C—C bonds, provided that at least two of Ar comprise a pendant 1-alkynyl group, especially ethynyl; each Y is individually

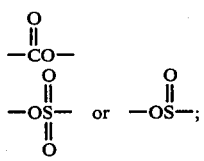

and n is zero or a whole number up to about 18. By 1-alkynyl is meant an alkynyl group containing —C≡CH. More preferred are polymers represented by the formula:

$$Ar_3+YAr_1-YAr_2+_nYAr_3 \quad (V)$$

wherein each $Ar_1$ is arylene, each $Ar_2$ is individually a divalent aromatic radical essentially free of acyclic, aliphatic C—C bonds and having a stearic volume comparable to

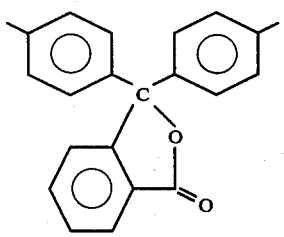

VI each $Ar_3$ is individually a monovalent aromatic group essentially free of acyclic, aliphatic C—C bonds and having at least one pendant ethynyl group, Y is

VII and n is zero or a positive integer from 1 to 18. In the foregoing polymer, it is most preferred that each $Ar_3$ is ar-ethynylphenyl, each $Ar_1$ is phenylene, each $Ar_2$ is a radical represented by Formula VI and n is 2 to 3. In the foregoing formulas, the divalent aromatic radicals are suitably arylene such as phenylene, naphthenylene and biphenylene; aryleneoxyarylene, arylenethioarylene or arylenecarboxylarylene such as

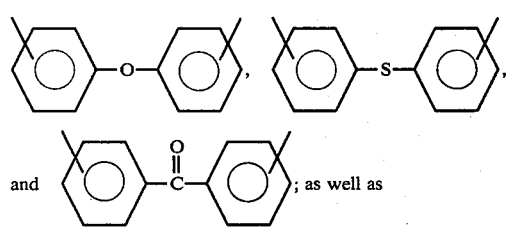

divalent radicals derived from a trityldiol such as phenolphthalein, phenolsulfonephthalein, phthalidene, fluorescein, phenolphthalimidene and substituted derivatives of such trityldiols wherein the substituents are fluoro, chloro, bromo, iodo, nitro, and other monovalent radicals which are essentially free of acyclic, aliphatic C—C bonds.

As further illustration of $Ar_1$ and $Ar_2$, these groups may be any divalent mono or polynuclear aromatic radical such as biphenylene, anthracenylene, naphthenylene, and others represented by the formulas:

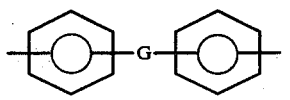
VIII

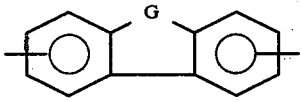

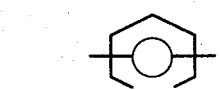

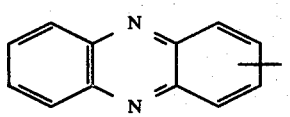

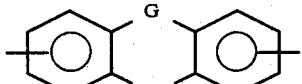

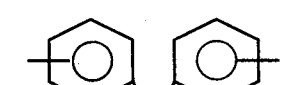

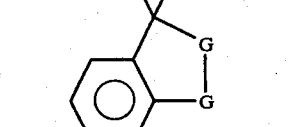

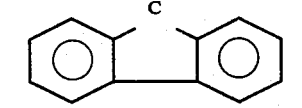

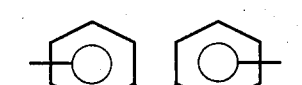

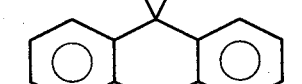

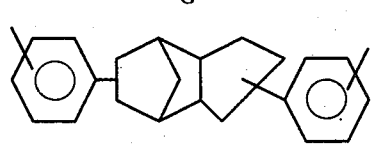

wherein each G in the foregoing formulas is individually thio, imino, oxo, methylene, carbonyl, carboxylate,

sulfone, sulfoxide, sulfonate

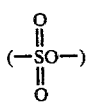

or sulfinate

Y as defined hereinbefore.

Also in the foregoing preferred formulas, each $Ar_3$ is a monovalent mono or polynuclear aromatic radical bearing one or more substituents such as 1-alkynyl, most preferably ethynyl, ethynyllauryl, e.g., ethynylphenyl, ethynylnaphthyl, ethynylanthracenyl, and ethynylbiphenyl; ethynylaryloxyaryl such as ethynylphenoxyphenyl; ethynylarylthioaryl such as ethynylthiophenoxyphenyl; ethynyl substituted aromatic heterocyclic radicals such as ethynylpyridinyl; ar-ethynyl-ar-methoxyaryl such as 4-ethynyl-2-methoxyphenyl; and ar-ethynyl-ar methylthioaryl such as 4-ethynyl-2-methylthiophenyl.

The thermosetting prepolymers of this invention advantageously have weight average molecular weights as determined by gel permeation chromatography in the range from about 500 to about 3000, preferably from about 1200 to about 1700. Such prepolymers melt readily at temperatures in the range from about 150° to about 250° C. and can be processed at such temperatures by conventional means such as extrusion, molding and other conventional fabrication techniques. Such polymers exhibit excellent adhesion to glass fibers and other reinforcing fibers and can be mixed, either by dry-blending or solution blending, with such fibers of various length and type to form fiber-reinforced molding compositions. Such prepolymers can also be used in the form of lacquers to impregnate fibrous fabrics such as glass fabric.

The thermosetting prepolymers of this invention are advantageously prepared by first reacting a bis(halocarbonyl, sulfonyl or sulfinyl)aromatic compound (hereinafter called diacid chloride) with a polyhydric aromatic compound, preferably a dihydric phenol. Such reaction is normally carried out in the presence of a hydrogen chloride acceptor such as a tertiary amine, e.g., pyridine, in an inert organic solvent, such as a chlorinated hydrocarbon, e.g., dichloromethane. After a suitable period of time, e.g., from one to two hours, the aforementioned reaction mixture is also treated with the appropriate ethynyl substituted phenol or acid chloride.

Exemplary diacid chlorides suitably employed in the preparation of the thermosetting prepolymers include bis(haloformyl)arenes such as terephthaloyl chloride, isophthaloyl chloride, 1,4-naphthalene dicarbonyl dichloride, terephthaloyl bromide, isophthaloyl iodide and the like; bis(halosulfonyl)arenes, e.g., 1,4-phenylene disulfonyl dichloride, bis(4-chlorosulfonylphenyl)ether, and corresponding dibromides and diiodides; bis(-halosulfinyl)arenes, e.g., 1,4-phenylene disulfinyl dichloride, and corresponding dibromides and diiodides; ar-(haloformyl)arylsulfonyl halides, ar-(haloformyl)arylsulfinyl halides, ar-(halosulfonyl)arylsulfinyl halides, e.g., 4-(chloroformyl)benzenesulfonyl chloride, 4-(chloroformyl)-4'-(chlorosulfonyl)biphenyl and corresponding bromo and iodo compounds; bis(ar-halosulfonylaryl)carboxylates, e.g., bis(4-chlorosulfonylphenyl)carboxylate; bis(ar-halosulfinylaryl) carboxylates, e.g., bis(4-chlorosulfinylphenyl) carboxylate; bis(ar-haloformylaryl) sulfonates, e.g., bis(4-chloroformylphenyl) sulfonate; bis(ar-halosulfinylaryl) sulfonates, e.g., bis(4-chlorosulfinylphenyl) sulfonate; and bis(ar-halosulfonylaryl) sulfinates, e.g., bis(4-chlorosulfonylphenyl) sulfinate. Of the foregoing aromatic diacid halides, the bis(haloformyl)arenes such as isophthaloyl chloride and terephthaloyl chloride are preferred.

Exemplary dihydric phenols suitably employed in the practice of this invention include ar,ar-dihydroxy benzenes such as resorcinol and hydroquinone, as well as ar,ar-dihydroxy naphthalenes and anthracenes, e.g., 2,7-dihydroxy naphthalene and 9,10-dihydroxy anthracene. Also included are trityldiols having an ar,ar'-dihydroxytrityl nucleus represented by the formula:

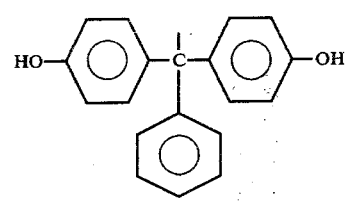

wherein the aromatic rings bear in addition to the hydroxy substituents such substituents as F, Cl, Br, I, —NO$_2$ and —O—. Exemplary trityldiols include phenolphthalein, phenolsulfonephthalein, phthalidene, fluorescein and phenol phthalimidene. Other dihydroxy aromatic compounds suitably included are those wherein the aromatic diradical is represented by the formulas of Formula VIII, e.g., bis(4-hydroxyphenyl)ether, bis(4-hydroxyphenyl)thioether, bis(4-hydroxyphenyl)sulfone, bis(4-hydroxyphenyl)ketone, 9,9-bis(4-hydroxyphenyl)fluorene, 1,1-bis(4-hydroxyphenol)indane, an isomeric mixture derived from the reaction of phenol with cyclopentadiene dimer, bis(4-hydroxyphenyl)carboxylate, bis(4-hydroxyphenyl)sulfonate and bis(4-hydroxyphenyl)sulfinate. Of the foregoing dihydric phenols, the dihydroxy benzenes such as resorcinol and hydroquinone and the trityldiols, particularly phenolphthalein, are preferred.

In the preparation of the thermosetting aromatic prepolymer, it is advantageous to prepare a mixture of the desired dihydric phenol and diacid chloride containing pyridine or some other suitable hydrogen chloride acceptor and effect reaction with temperatures of 0° to 50° C. at ambient pressure for a period from 1 to 24 hours. Such reactions are often advantageously carried out in the presence of solvents such as a chlorinated hydrocarbon, e.g., dichloromethane, chloroform and 1,2-dichloroethane. In reactions carried out in the presence of solvents, it is advantageous to first react the dihydric phenol and diacid chloride in a solvent containing pyridine to form a precursor for the prepolymer and then react this precursor with a phenol having one or more alkynyl substituents. These reactions are normally carried out at reactant concentrations sufficient to provide a resulting prepolymer concentration in the range from about 5 to about 15 weight percent based on the total reaction mixture.

Exemplary ar-ethynyl phenols include ar-ethynylphenols, e.g., 2-ethynylphenol, 3-ethynylphenol and 4-ethynylphenol; ar-ethynylnaphthols and ar-ethynylanthracenols, e.g., 2-ethynyl-1-napthol; arethynylarylphenols, e.g., 2-ethynyl-4-phenylphenol and 4-(4-ethynylphenyl)phenol and 4-ethynyl-2-phenylphenol; ar-ethynylaryloxyphenols and ar-ethynylarylthiophenols, e.g., 4-(4-ethynylphenoxy)phenol, 4-(3-ethynylphenoxy)phenol, and 4-(4-ethynylphenylthio)phenol; ar-ethynyl-ar-methoxyphenols and ar-ethynyl-ar-methylthiophenols, e.g., 3-ethynyl-4-methoxyphenol and 3-ethynyl-4-methylthiophenol; ar-(ar-ethynylarylsulfonyl) phenol, ar-(ar-ethynylarylsulfinyl)phenol and ar-(ar-ethynyl arylcarbonyl)phenol, e.g., 4-(3-ethynylphenylsulfonyl)phenol and 4-(4-ethynylphenylcarbonyl)phenol.

Alternatively, the ethynyl substituents can be incorporated into the internal portions instead of the terminal points of the backbone of the prepolymer molecule by employing a diacid chloride or a dihydric phenol bearing such ethynyl substituents. Examples of such ethynyl substituted dihydric phenols and diacid chlorides include 3-ethynyl-4,4'-dihydroxybiphenyl, 4-(3-ethynyl-4-hydroxyphenoxy)phenol, 4-(3-ethynyl-4-hydroxyphenylthio)phenol, 4-(3-ethynyl-4-hydroxyphenylsulfonyl)phenol, bis(3-ethynyl-4-hydroxyphenyl)methane, 3,3'-diethynyl-4,4'-dihydroxybiphenyl, bis(3-ethynyl-4-hydroxyphenyl)oxide, bis(2-ethynyl-4-hydroxyphenyl)sulfide, 1,3-dichloro-5-(3-ethynylphenoxy)-s-triazine and other dihydric phenols and diacid chlorides as described hereinbefore which also bear at least one pendant ethynyl group.

When thermosetting prepolymers having sulfonyl and/or sulfinyl linkages are desired, the prepolymer is advantageously prepared by reacting the appropriate sulfinyl and/or sulfonyl diacid chloride with dihydric phenol under conditions similar to those described hereinbefore for preparing the prepolymer containing carbonyloxy linkages. Similarly, prepolymers having carbonyloxy linkages and sulfonyl and/or sulfinyl linkages can be prepared by reacting the appropriate diacid chlorides with dihydric phenol in the conventional manner. Also ordered or alternating prepolymers may be prepared by reacting a carbonyloxy diacid chloride with a bis(ar-hydroxyaryl) sulfonate

and/or sulfinate

or by reacting a sulfonyl or sulfinyl diacid chloride with a bis(ar-hydroxyaryl) carboxylate. Other combinations of the various suitable linkages and aromatic groups, both ordered (alternating) or random can be readily determined and prepared by the skilled artisan and are therefore within the scope of this invention.

Following the preparation of the thermosetting aromatic prepolymer, the prepolymer can be recovered and molded into desired shape as in the molding of any thermoplastic polymer such as extrusion, injection molding, compression molding and the like. Alternatively, the prepolymer dissolved in a common organic solvent such as methylene chloride, chloroform, dichloroethane, dioxane, tetrahydrofuran, methyl ethyl ketone and the like can be blended with fibrous reinforcing materials such as glass fibers and/or other additaments for such curable prepolymers such as pigments, fillers, stabilizers and the like. In curable compositions containing fibrous reinforcing materials, the composition advantageously contains at least 30 weight percent of the prepolymer and a reinforcing amount of the fibrous material.

The resulting curable prepolymer composition can then be placed in a mold and cured to the desired thermoset polymer by heating the same to a temperature in the range from about 180° to about 300° C., preferably from about 200° to about 240° C. The time required to cure the prepolymer is dependent on the curing temperature, the thickness of the prepolymer article to be cured and the chemical structure of the prepolymer. Typically a period from about 5 to about 15 minutes at a temperature from about 180° to about 250° C. is adequate to initially cure an article having a thickness from about 0.16 to about 0.32 centimeter. At this point of cure, the polymer article is usually from about 65 to about 75 percent cured and may be reground and reused by combining it with from about 20 to about 40 weight percent of fresh (uncured) prepolymer based on weight of the initially cured polymer and subjecting the combination to a subsequent cure cycle similar to the initial cure. After the initial cure or the subsequent cure, as the case may be, the article is advantageously withdrawn from the initial cure receptacle, e.g., a mold, and post cured by heating the article over a temperature range such that the temperature of the article increases from about 60° C. to about 300° C. at the rate of 1° C. per minute. The article is then beneficially maintained at about 300° C. for a period from about 10 to about 12 hours. In instances wherein it is desirable to accelerate the rate of cure and/or lower temperature of cure, it is often desirable to incorporate a small amount, e.g., from about 5 to about 30 weight percent based on the weight of total prepolymer, of a prepolymer having a fairly high concentration, e.g., at least about 40 mole percent, of alkynyl moiety. Such high alkynyl prepolymer is particularly useful in the curing of reused partially cured polymer.

The resulting thermoset polymers are insoluble in all solvents and can be heated to temperatures above 200° C. for extended periods without loss of weight of other physical properties.

The following examples are given to illustrate the invention and should not be construed as limiting its scope. Unless otherwise indicated, all parts and percentages are by weight.

EXAMPLE 1

In a 3-liter reaction vessel, a 75-ml portion of pyridine is added dropwise over 15 minutes to a stirred solution of phenolphthalein (63.66 g, 0.2 mole) in dichloromethane (725 ml) and terephthaloyl chloride (60.9 g, 0.3 mole). After stirring this mixture for a period of 2 hours, a solution of m-ethynylphenol (23.6 g, 0.2 mole) in 100-ml methylene chloride is added to the foregoing reaction mixture which is then stirred and refluxed gently for 2 hours. The resulting mixture is then diluted with 375-ml methylene chloride and washed in succession with water, aquoeus HCl, aqueous NaOH, aqueous HCl, and finally water. The resulting thermosetting prepolymer (90 g, 90% yield) is isolated by precipitation from methanol and dried under vacuum at 110° C. The prepolymer softens at a temperature of about 170° C. and melts at about 190° C. at which time the prepolymer cures to a non-melting thermoset polymer. The prepolymer is determined to be represented by the following structural formula:

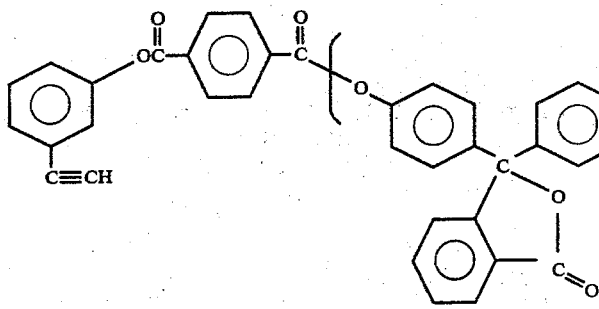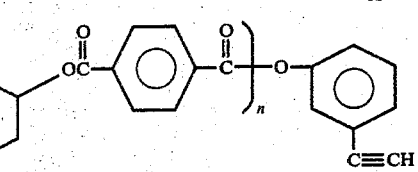

A ~57-g. test portion of this prepolymer is initially cured in a matched-die mold (8.9 cm×15.2 cm×0.32 cm) at 185° C. and 425 psi for a period of one hour. The test bar is then removed from the mold and post-cured under the conditions specified hereinbefore. The resulting thermoset polymer samples are tested for flexural strength and flexural modulus and the results are reported in Table I. A 28-g portion and 22-g portion of the thermosetting prepolymer are respectively dissolved in 175 ml and 150 ml of dichloromethane and then combined with a 12-g portion and a 41-g portion of glass fibers (0.64 cm length) to provide two samples having fiber concentrations of 30 percent and 65 percent. These samples are heated to remove dichloromethane and then initially cured in a matched-die mold (4.8 cm×10.2 cm×0.32 cm) under the same conditions of 185° C. and 425 psi. Following a post-cure as specified hereinbefore, these samples are similarly tested for flexural strength and flexural modulus and the results are reported in Table I.

The m-ethynylphenol employed in the practice of this example is prepared from β-chloro-β-(m-acetoxyphenyl)acrolein. The β-chloroacrolein is prepared by adding phosphorus oxychloride (766.7 g., 5 moles) dropwise over a period of 2.5 hours under nitrogen to 1.5 liters of stirred dimethylformamide. An ice bath is required to maintain the temperature of the reaction mixture below 22° C. After the addition of the phosphorus oxychloride is complete, the resulting solution is stirred for one hour and then cooled to 5° C. To this solution is added a solution of m-acetoxyacetophenone (445 g, 2.5 moles) in one liter of dimethylformamide while keeping the temperature of the reaction mixture below 40° C. After standing overnight, the mixture is added with stirring to 9 liters of ice cold water containing 3 kg of sodium bicarbonate. The β-chloroacrolein separates as a cream-colored solid which, after filtering and drying, weighs 378.9 g (yield of 67.5 percent). This cream-colored solid is analyzed by NMR and determined to be β-chloro-β-phenylacrolein.

The β-chloroacrolein (175 g, 0.78 mole), prepared in the foregoing manner, is dissolved in 600 ml of dioxane and added over a 50-minute period to 1 liter of an aqueous solution of sodium hydroxide (131 g, 3.75 moles) which is preheated to about 90° C. After the addition is complete, the resulting mixture is refluxed for one hour, cooled to 15° C., and acidified to pH of 6 by adding ice cold (20%) aqueous HCl. A dark red oil separates from the reaction mixture and is extracted with dichloromethane. The dichloromethane solution is washed with water, dried over anhydrous magnesium sulfate and concentrated in vacuum. The resulting residue is combined with the residue from another similar run starting with 380 g (1.693 moles) of β-chloro-β-phenylacrolein. The combined residues are distilled through a 12-inch Vigreaux column. A fraction boiling in the range of 63°–65.5° C. at 0.9 mm Hg is collected and found to contain 198.5 g (yield of 68 percent). This fraction is analyzed by NMR and found to be m-ethynylphenol.

EXAMPLE 2

Following the procedure of Example 1, isophthaloyl chloride (97.5 g, 0.48 mole), phenolphthalein (101.9 g, 0.32 mole), and m-ethynylphenol (41.5 g, 0.35 mole) are reacted to give a thermosetting prepolymer (180 g, 90%) of the structure of Formula XI

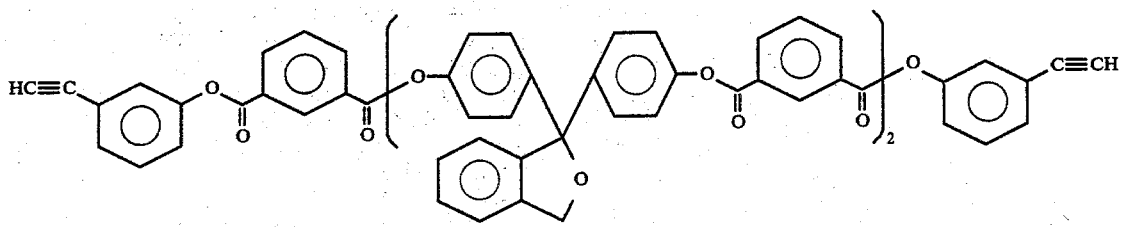

Test bars are initially cured at 300 psi, 220° C. and then post-cured by the procedure of Example 1. These post-cured bars are then tested for flexural strength and modulus and the results are shown in Table I.

EXAMPLE 3

Again following the procedure of Example 1, isophthaloyl chloride (162.5 g, 0.8 mole), phenolphthalein (191 g, 0.6 mole) and m-ethynylphenol (50.5 g, 0.43 mole) is reacted to form a prepolymer (90% yield) having the structure of Formula XI wherein n=3. Test bars are prepared by the procedure of Example 1 and tested for flexural strength and modulus. The results are given in Table I.

EXAMPLE 4

A solution of isophthaloyl chloride (32.48 g, 0.16 mole) in 100 ml of methylene chloride is added to a stirred mixture of resorcinol (13.2 g, 0.12 mole), pyridine (50 ml), m-ethynylphenol (9.44 g, 0.08 mole), and methylene chloride (200 ml) under nitrogen at a temperature of 20°–45° C. The resulting mixture is then refluxed at 45° C. for a period of 6 hours and evaporated to almost dryness under vacuum. The resulting residue is washed by the procedure of Example 1 and then dried to a white powder (41.1 g, yield 94.6%). The prepolymer is determined to have a structural formula as follows:

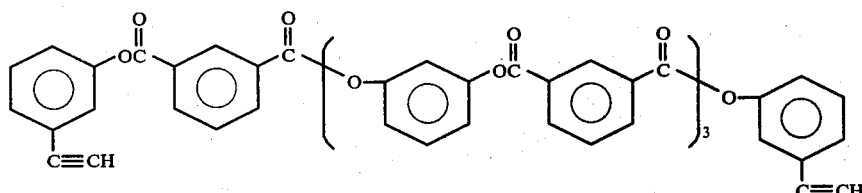

The prepolymer is cured by compressing molding the white powder (neat) into test bars (10.2 cm × 1.9 cm × 0.32 cm) at a temperature of 220° C. and a pressure of 400 psi for 15 minutes. The resulting bars are tested for flexural modulus and flexural strength and the results of these tests are reported in Table I.

EXAMPLE 5

Following the procedure of Example 4, except that hydroquinone is substituted for resorcinol, a prepolymer (41.6 g, yield of 95.8%) is obtained and tested for flexural strength and flexural modulus. The results of these tests are also reported in Table I.

EXAMPLE 6

A 20-ml portion of pyridine is added under nitrogen to a stirred mixture of phenolphthalein (19.01 g, 0.06 mole) and terephthaloyl chloride (10.15 g, 0.05 mole) in 200 ml of methylene chloride. After refluxing the resulting mixture for 2 hours, a solution of bis-(m-ethynylphenoxy)-chloro-1,3,5-triazine (7.65 g, 0.022 mole) (Formula XII) in methylene chloride is added to the reaction mixture. The resulting mixture is refluxed at 45° C. for 3 more hours and then cooled to room temperature. The mixture is washed once with 600 ml of 0.1 N HCl and five times with water (500 ml each wash). The resulting prepolymer is isolated as a white powder (28.5 g, yield 90%) by precipitation from methanol. The resulting prepolymer is molded and cured into test bars (10.2 cm × 1.9 cm × 0.32 cm) by the procedure of Example 1 and then tested for flexural modulus and flexural strength. The results of these tests are also reported in Table I.

The bis-(m-ethynylphenoxy)-chloro-1,3,5-triazine is prepared by first adding m-ethynylphenol (11.4 g, 0.097 mole) in 20 ml of a 5 N NaOH dropwise to a stirred solution of cyanuric chloride (9.22 g, 0.05 mole) in 50 ml of acetone with stirring at 15°–18° C. After stirring for one hour at this temperature, the resulting mixture is filtered to remove a white solid which is washed with water and dried in vacuum overnight at 35° C. The yield of the product is 16.14 g (yield of 95.8%). The product has a melting point of 121°–125° C. which increases to 127°–128° C. upon one recrystallization from chloroform/heptane. This product is analyzed by NMR and determined to be bis-(m-ethynylphenoxy)-chloro-1,3,5-triazine represented by the formula:

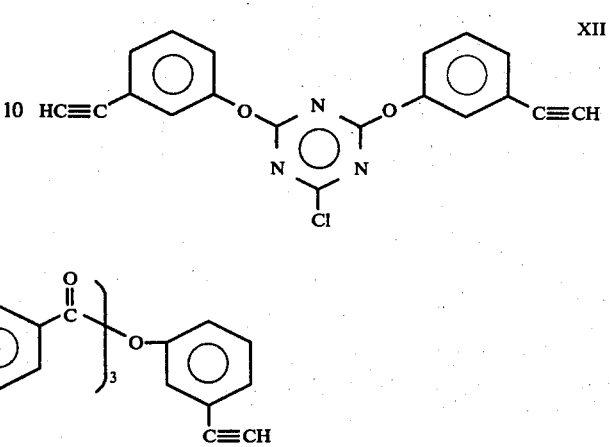

TABLE I

| Example No. | Glass Fiber Wt. % | Flexural Properties[1] | |
|---|---|---|---|
| | | Strength × $10^{-3}$ psi | Modulus × $10^{-5}$ psi |
| 1 | None | 14.0 | 5.1 |
| 1 | 30 | 19.4 | 12.4 |
| 1 | 65 | 28.5 | 24.7 |
| 2 | None | 14.2 | 4.1 |
| 3 | None | 12.0 | 4.1 |
| 4 | None | 11.8 | 5.1 |
| 5 | None | 8.5 | 3.0 |
| 6 | None | 13.5 | 4.9 |

[1] ASTM D-790

EXAMPLE 7

Following generally the procedure of Example 4, isophthaloyl chloride (14.21 g, 0.07 mole), resorcinol (6.6 g, 0.06 mole), m-ethynylphenol (2.36 g, 0.02 mole), pyridine (50 ml), methylene chloride (200 ml) are mixed and reacted to form a thermosetting prepolymer having a structural formula similar to that of Example 4 except that n equals 6 instead of 3 and is obtained in 98% yield.

When isophthaloyl chloride (26.3 g, 0.13 mole), resorcinol (13.2 g, 0.12 mole), m-ethynylphenol (2.36 g, 0.02 mole), pyridine (50 ml), and methylene chloride (250 ml) are reacted in accordance with the procedure of Example 4, a 30-g portion (yield of 92.4%) or prepolymer is obtained. The prepolymer has a structural formula similar to that of Example 4 except that n equals 12 instead of 3.

When isophthaloyl chloride (19.29 g, 0.095 mole), resorcinol (9.9 g, 0.09 mole), m-ethynylphenol (1.18 g, 0.01 mole), pyridine (50 ml), and methylene chloride (210 ml) are reacted in a manner as described in Example 2, a prepolymer in 87.5 percent yield is obtained. This prepolymer exhibits a structural formula similar to that of Example 4 except that n equals 18 instead of 3.

All of the polymers prepared in Examples 1–7 are solid at room temperature, soften at temperatures of 150°–200° C., cure at temperatures as low as 185° C. without a cross-linking catalyst or a reactive diluent to form thermoset polymers having excellent thermal oxidative stability and mechanical properties. During the curing processes, it is noted that no volatile products are liberated. Of the foregoing prepolymers, those employing phenolphthalein as a dihydric phenol exhibit excellent solubility in the most common organic solvents such as dichloromethane, chloroform and 1,2-dichloroethane. Except for the prepolymers derived from hydroquinone, the aforementioned prepolymers are soluble in somewhat more expensive solvents such as dimethylacetamide, N-methylpyrrolidone and dimethylsulfoxide.

EXAMPLE 8

As evidence of the fact that these prepolymers give cured products capable of retaining their room temperature mechanical properties at elevated temperatures, several of the aforementioned prepolymers are tested at 260° C. for flexural strength and modulus. In addition, glass cloth laminates of the prepolymer in Example 1 are prepared and similarly tested. The results are shown in Table II.

TABLE II

| Sample No. | Prepolymer | Flexural Properties (1) | | | | | |
|---|---|---|---|---|---|---|---|
| | | Strength × 10⁻³ psi | | | Modulus × 10⁻⁶ psi | | |
| | | At 23° C. | At 260° C. | % Change | At 23° C. | At 260° C. | % Change |
| 1 | Example 1, Neat | 14.0 | 11.6 | −17.2 | 0.51 | 0.28 | −45.7 |
| 2 | Example 2, Neat | 14.2 | 10.1 | −28.9 | 0.41 | 0.27 | −33.5 |
| 3 | Example 3, Neat | 12.0 | 7.7 | −35.8 | 0.41 | 0.26 | −35.9 |
| 4 | Example 1, laminate (a) | 89.9 | 77.8 | −13.5 | 2.84 | 2.48 | −12.7 |

(a) Laminate contains 35 percent of the prepolymer of Example 1 and 65 percent of glass fabric.
(1) ASTM D-790. For samples tested at 260° C., the sample is maintained at that temperature for a period of 0.5 hour prior to testing it at room temperature.

As evidenced by the foregoing data, the thermoset polymers of this invention can be exposed to temperatures up to 260° C. for short periods without suffering a 50% loss of original physical properties.

EXAMPLE 9

For the purpose of illustrating the long-term stability of the resins of this invention, glass cloth laminates prepared from the prepolymer of Example 1 are exposed to air at 250° C. for up to 1000 hours. The glass laminate is the same as Sample No. 4 of Table II. The laminates are tested for flexural strength and modulus at 23° C. and 260° C. and the results are reported in Table III.

TABLE III

| Hours At 250° C. | % Wt. Loss | Flexural Properties (1) | | | |
|---|---|---|---|---|---|
| | | Strength × 10⁻³ psi | | Modulus × 10⁻⁶ psi | |
| | | 23° C. | 260° C. | 23° C. | 260° C. |
| 0 | — | 89.9 | 77.8 | 2.84 | 2.48 |
| 250 | 0.02 | 94.1 | 61.9 | 2.91 | 2.44 |
| 500 | 0.13 | 91.7 | 47.4 | 2.89 | 2.35 |
| 1000 | 0.44 | 90.4 | 55.3 | 2.81 | 2.38 |

(1) Same as (1) in TABLE II.

The results in Table III show that this severe heat aging condition has no effect on the room temperature mechanical properties of the laminates. The only deleterious effect observed is a reduction in the retention of flexural strength at 260° C. The very small weight loss of 0.44% after 1000 hours at 250° C. is an additional evidence of the thermal oxidative stability of the resins of this invention.

EXAMPLE 10

To illustrate the inertness of the resins in this invention toward environments other than air, glass cloth laminates prepared from the prepolymer of Example 1 are immersed in a variety of liquids for 8 days and boiled in water for 2 hours, and then tested for flexural strength and modulus at 23° C. The results are given in Table IV.

TABLE IV

| Sample No. | Environmental Exposure | % Wt. Change | Flexural Properties (1) | |
|---|---|---|---|---|
| | | | Strength × 10⁻³ psi | Modulus × 10⁻⁶ psi |
| 1 | None | — | 82.1 | 2.70 |
| 2 | 8 days in acetone | +1.39 | 77.7 | 3.09 |
| 3 | 8 days in toluene | +0.18 | 80.7 | 2.99 |
| 4 | 8 days in 1,2-dichloroethane | +1.23 | 80.6 | 3.05 |
| 5 | 8 days in methanol | +1.44 | 83.7 | 2.75 |
| 6 | 2 hours water boil | +0.64 | 63.3 | 2.89 |
| 7 | 8 days in 1N HCl | +0.43 | 56.6 | 2.44 |
| 8 | 8 days in 1N H₂SO₄ | +0.65 | 61.1 | 2.43 |

(1) Same as (1) in Table II.

As evidenced by the foregoing data, the flexural properties of the laminates are unaffected, within experimental error, by immersion in the organic solvents examined. The decrease in properties caused by the aqueous treatments is not severe.

EXAMPLE 11

The prepolymer described in Example 1 is cured by molding at 220° C. into test specimens of the appropriate dimensions and tested for electrical properties. The results are shown in Table V.

TABLE V

| | Dry | 24 Hour Water Soak |
|---|---|---|
| Dielectric Constant (1) | | |
| 60 Hz | 3.29 | 3.59 |
| 10³ Hz | 3.29 | 3.63 |
| 10⁶ Hz | 2.97 | 3.28 |
| Dissipation Factor (2) | | |
| 60 Hz | 0.00460 | 0.00397 |
| 10³ Hz | 0.00084 | 0.00082 |
| 10⁶ Hz | 0.02405 | 0.03195 |
| Dielectric Strength (3) | | |
| Volts per mil | 581 | 485 |

(1) ASTM D150
(2) ASTM D150
(3) ASTM D149

As evidenced by the data of Table V, the thermoset polymers of this invention are essentially non-conductive and are therefore useful as insulative materials in electrical applications.

What is claimed is:

1. An aromatic thermosetting prepolymer consisting essentially of repeating units of the formula:

wherein each Ar is independently an aromatic group essentially free of acyclic aliphatic carbon-to-carbon bonds provided that at least two of Ar have pendant 1-alkynyl substituents and each Y is independently

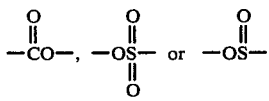

said prepolymer being curable upon application of heat to form a heat-resistant thermoset polymer.

2. An aromatic thermosetting prepolymer represented by the formula:

Ar-(-YAr-)$_n$-YAr wherein each Ar is independently an aromatic group essentially free of acyclic aliphatic carbon-to-carbon bonds provided that at least two of Ar have pendant 1-alkynyl substituents; each Y is independently:

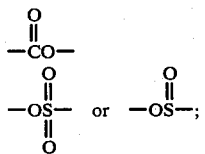

and n is zero or an integer from 1 to about 18, said prepolymer being curable upon the application of heat to form a thermoset polymer having thermal oxidative stability at temperatures up to about 250° C.

3. The prepolymer of claim 2 wherein each Ar is independently arylene or a divalent radical derived from a compound selected from the group consisting of phenolphthalein, phenolsulfonephthalein, phthalidene, fluorescein and phenolphthalimidene by reacting said compound with a diacid chloride and 1-alkynyl is ethynyl.

4. The prepolymer of claim 2 wherein each Ar of —YAr—$_n$ is independently arylene or a divalent aromatic radical represented by one of the formulas:

VIII

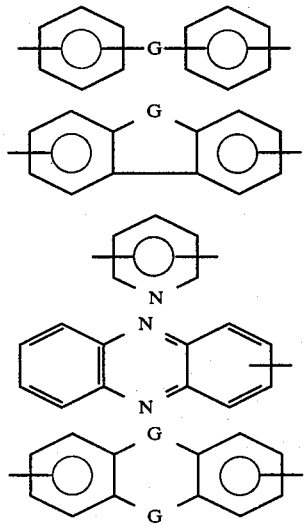

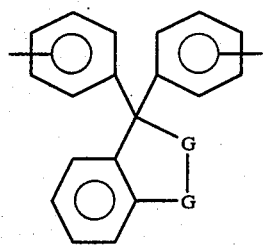

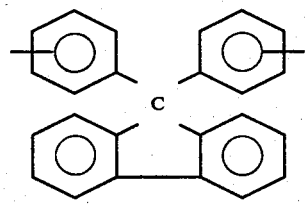

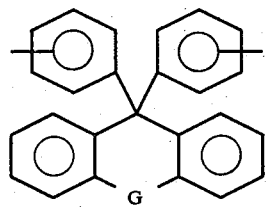

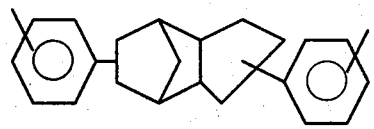

wherein each G in the foregoing formulas is independently thio, imino, oxo, methylene, carbonyloxy, sulfonyloxy or sulfinyloxy and 1-alkynyl is ethynyl.

5. The prepolymer of claim 2 represented by the formula:

Ar$_3$-(-YAr$_1$-YAr$_2$-)$_n$-YAr$_3$ wherein each Ar$_1$ is independently arylene, each Ar$_2$ is independently a divalent aromatic group essentially free of acyclic aliphatic carbon-to-carbon bonds and, each Ar$_3$ is individually a monovalent aromatic group which is essentially free of acyclic, aliphatic carbon-to-carbon bonds and has a pendant ethynyl group, Y is carbonyloxy and n is zero or an integer from 1 to about 18.

6. The prepolymer of claim 5 wherein Ar$_1$ is phenylene; Ar$_2$ is a radical represented by the formula:

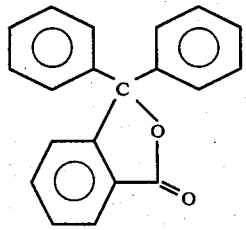

Ar$_3$ is ar-ethynylphenyl and n is an integer from about 1 to about 18.

7. The prepolymer of claim 2 which is represented by the formula:

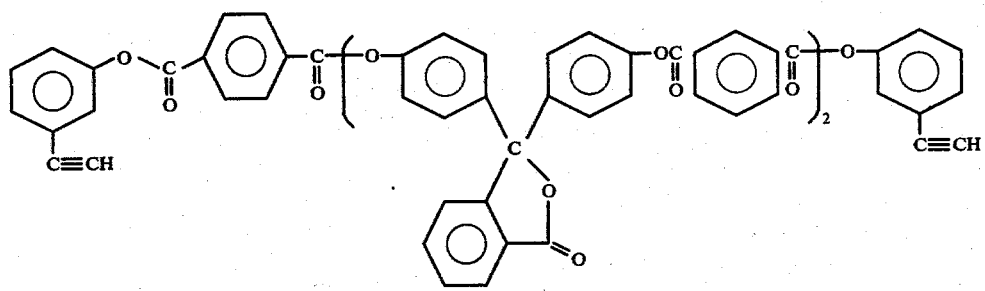
8. The prepolymer of claim 2 which is represented by the formula:
9. A thermoset polymer prepared by heating the prepolymer of claim 1.
10. The thermoset polymer of claim 9 in the form of an automobile engine part.
11. The thermoset polymer of claim 9 in the form of a high temperature adhesive.
12. The thermoset polymer of claim 9 in the form of an insulative film.